Figure 1:
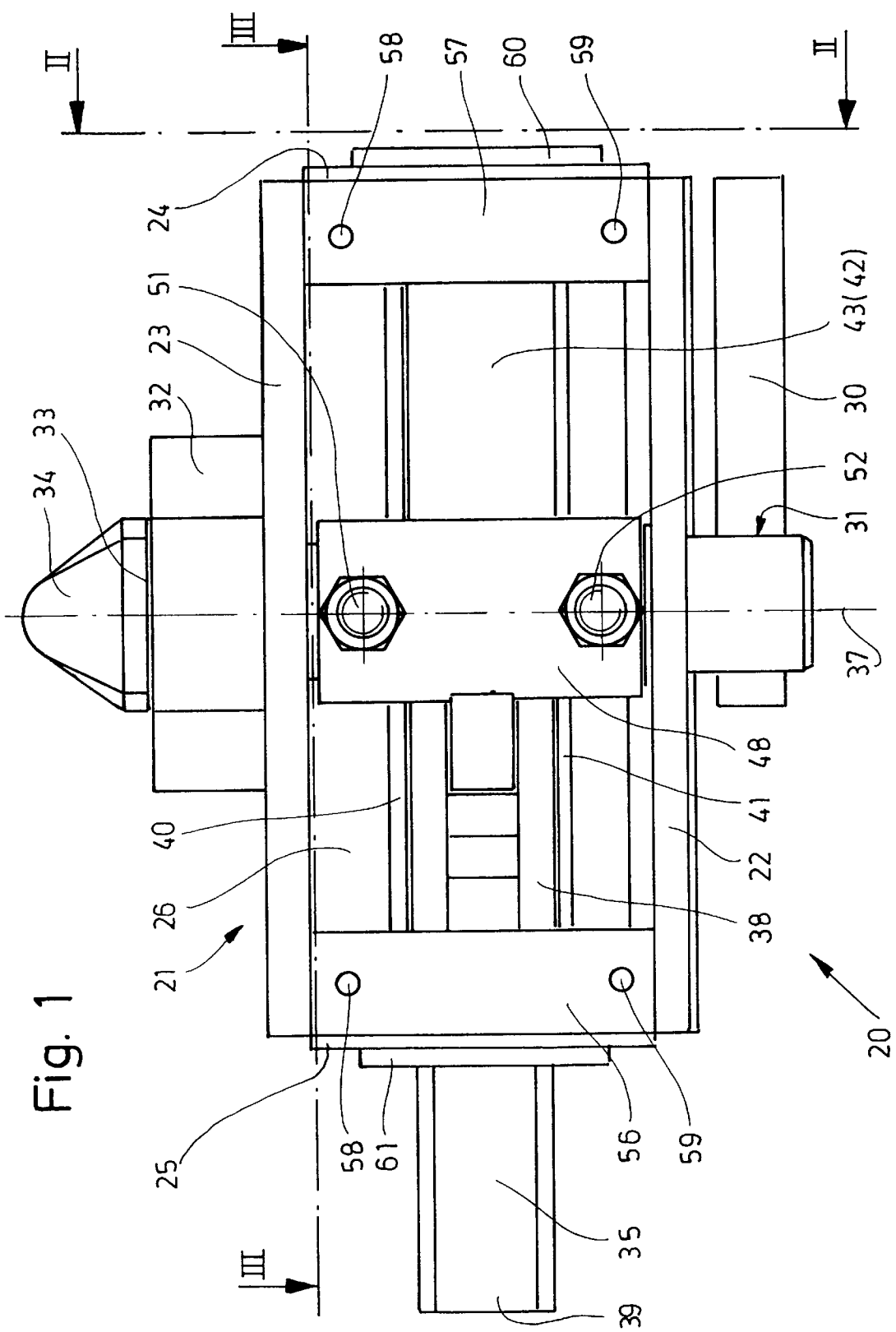

United States Patent [19]
Schulz et al.

[11] Patent Number: 6,092,967
[45] Date of Patent: Jul. 25, 2000

[54] LOCK FOR CONTAINERS ON A VEHICLE CHASSIS

[76] Inventors: Frank P. Schulz, Kirschenallee 22, Rinteln 31337, Germany; Hans-Eckart Milkereit, Am See 45, Bebensee 23816, Germany

[21] Appl. No.: 09/079,249

[22] Filed: May 14, 1998

[30] Foreign Application Priority Data

May 14, 1997 [DE] Germany .......................... 197 20 238

[51] Int. Cl.⁷ .................................................. B60P 7/08
[52] U.S. Cl. ............................................. 410/82; 410/76
[58] Field of Search .................................. 410/82, 83, 73, 410/76; 24/287; 248/500, 503

[56] References Cited

U.S. PATENT DOCUMENTS

| | | | |
|---|---|---|---|
| 2,439,423 | 4/1948 | Fowler | 410/82 X |
| 3,872,555 | 3/1975 | Link et al. | |
| 4,023,504 | 5/1977 | Grey | |
| 4,352,613 | 10/1982 | Bertolini | 410/82 |
| 5,141,372 | 8/1992 | Donner | 410/82 |
| 5,765,977 | 6/1998 | Reynard | 410/82 |
| 5,927,916 | 7/1999 | Kroll et al. | 410/83 |

FOREIGN PATENT DOCUMENTS

| | | |
|---|---|---|
| 0 051 107 A1 | 5/1982 | European Pat. Off. . |
| 0545019 | 6/1993 | European Pat. Off. . |
| 196 06 263 A1 | 9/1996 | Germany . |

*Primary Examiner*—Stephen T. Gordon
*Attorney, Agent, or Firm*—Technoprop Colton LLC

[57] ABSTRACT

The invention relates to a lock for containers on a vehicle chassis, in particular on a gooseneck chassis, with a housing (21), a displaceable bolt lock (35) mounted in the housing and a pivotable twist lock (28) mounted in the housing. Usually, such locks with two locking members also have a plurality of actuating members. These require additional openings and bores in the housing. The operating personnel must also know exactly how the latching mechanism operates. In the lock according to the invention, the bolt lock (35) and the twist lock (28) are connected to each other by means of a geared coupling in such a way that when the twist lock is actuated the bolt lock is also displaced and/or the twist lock is turned when the bolt lock is actuated.

21 Claims, 10 Drawing Sheets

LOCK FOR CONTAINERS ON A VEHICLE CHASSIS

DESCRIPTION

The invention relates to a lock for containers on a vehicle chassis, in particular on a gooseneck chassis with a housing, a displaceable bolt lock mounted in the housing and a pivotable twist lock also mounted in the housing.

Vehicle chassis for receiving 40-foot and 20-foot long containers are increasingly designed as so-called gooseneck chassis. These are provided with a lower rear section and a higher front section. For receiving containers with or without a gooseneck tunnel, both sides of the front end of the front section are equipped with special locks, known, for example, on the German Utility Model G 91 14 903.7. These locks have a bolt lock that can be slid in the horizontal plane for securing a container with a gooseneck tunnel, and a twist lock that pivots around a vertical axis for securing a container having a different design. The two different locking mechanisms are held in the same housing for each lock and are actuated separately. In order to do so, operating members must be drawn out of the housing. The operator must know exactly into which position the operating element is to be placed for each type of container. Due to its many openings, the known housing is subject to contamination. Because of the number of different settings, operating errors can be easily made.

The object of the present invention is to create a lock of the type described above that is easy to operate and positioned as protectively as possible. In order to achieve this object, the lock according to the invention is characterized in that the bolt lock and the twist lock are coupled to one another in their operation such that the bolt lock is also displaced when the twist lock is actuated and/or the twist lock is turned when the bolt lock is actuated.

The described coupling of bolt lock and twist lock makes it possible to provide a common operating element for both functions. One operating element is all that is required for a mechanical coupling between twist lock and bolt lock. Accordingly, a lever can be disposed on one end of the twist lock that projects from the housing. The housing then has a maximum of three openings, namely for the two ends of the twist lock and for one end of the bolt lock. The housing can otherwise be sealed in design. This effectively prevents contamination and corrosion of the individual parts.

For the geared connection between bolt lock and twist lock, the twist lock has the advantageous feature of a gear toothing, in particular a toothed wheel segment of approximately 80° to 140°. In analogous fashion, the bolt lock or an extension of the same arranged in the housing has a gear toothing, in particular of a toothed rack or mangle gear type. The two named gear toothings of twist lock and bolt lock intermesh, thus achieving a geared coupling of their functions.

Usually a continuation of the bolt lock's axis intersects the axis of the twist lock. To make sure that this is also possible in the lock according to the invention, an extension of the bolt lock is bent at a right angle in a lateral direction to the latter so that the extension runs laterally adjacent to the twist lock. In an advantageous manner the extension is guided, mounted or held displaceable along a side wall of the housing.

According to a particularly advantageous embodiment, a lever is arranged on the lower end of the twist lock that is led out of the housing, said lever being disposed perpendicular to the rotational axis of the twist lock, in particular offset relative to the bottom side of the housing. This allows the twist lock to be kept short while still maintaining an ergonomically sufficient space for gripping the lever.

Another and independent aspect of the invention relates to the design of the housing. For the optional mounting on either the right or left side of the chassis, it is basically symmetrical in design, having an top wall, bottom wall, side walls and small end walls, with an opening in the top wall and preferably also in the bottom wall for accommodating the twist lock and openings in the end walls for in particular the optional outward projection of the bolt lock.

Usually the bolt lock projects from the housing at only one of its ends. Furthermore both ends preferably have openings which can be closed by corresponding lids or covers. The lock can thus be prepared for mounting on either the left side or right side by simply changing the arrangement of the bolt lock within the housing.

In every design of the lock a non-used opening in the region of the end wall can be provided for a clearance lamp or for a component made for this purpose. Special mountings for such lamps are then unnecessary.

A further aspect of the invention provides for sealing means in the region of the openings for the bolt lock and/or twist lock, in particular sealing rings and/or guide bushes. The sealing of the otherwise closed housing is thus practically perfect. Accordingly, there is no possibility of dust and impurities entering the housing.

Finally, an independent aspect of the invention relates to a lock with a new kind of actuation. This involves having at least a pneumatic or hydraulic driven piston-cylinder unit arranged on or in the housing for the purpose of actuating the bolt lock and/or twist lock. In this manner a remote control of latching operations is possible. This represents an advantage in light of the current emphasis on speed in loading and unloading containers. In an advantageous development, the twist lock is assigned a lever drive that can be impinged by the piston-cylinder unit for turning the twist lock. In the process it is also possible to design a lock with only one type of latching element, i.e. with either bolt locks or twist locks.

Further features of the invention are disclosed in the claims and in the following text of this description.

Figure 2:
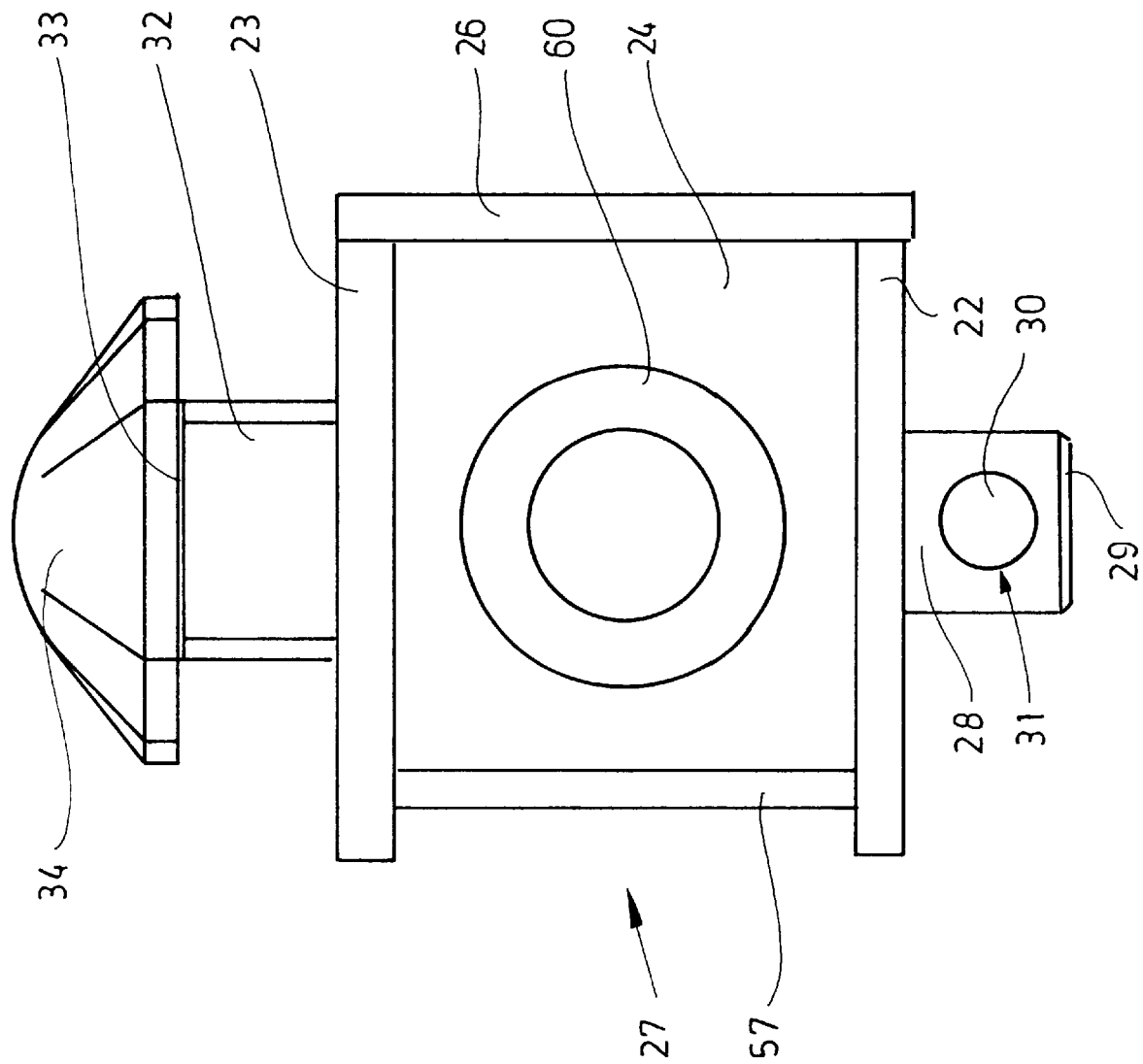
Figure 3:
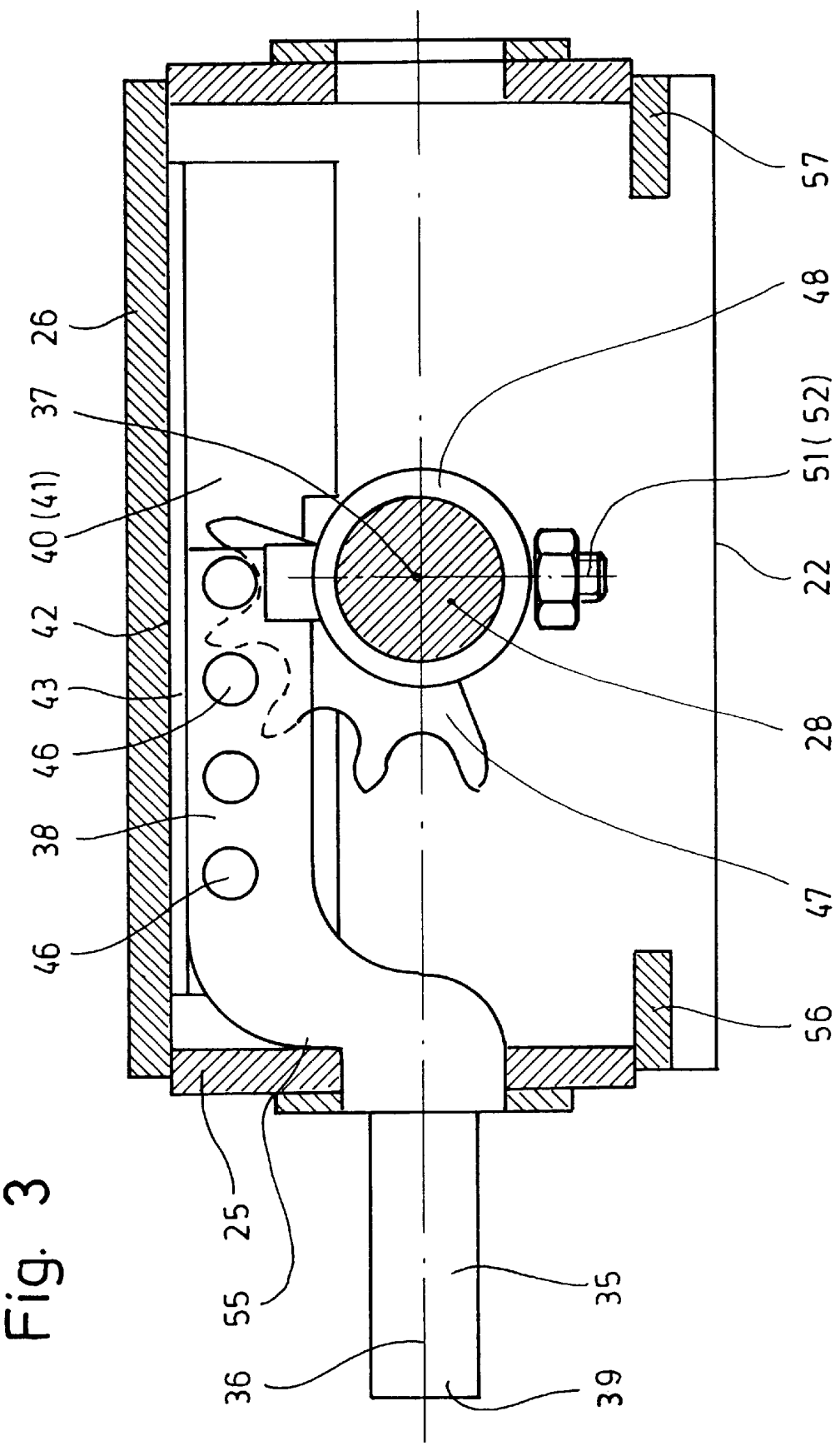
Figure 4:
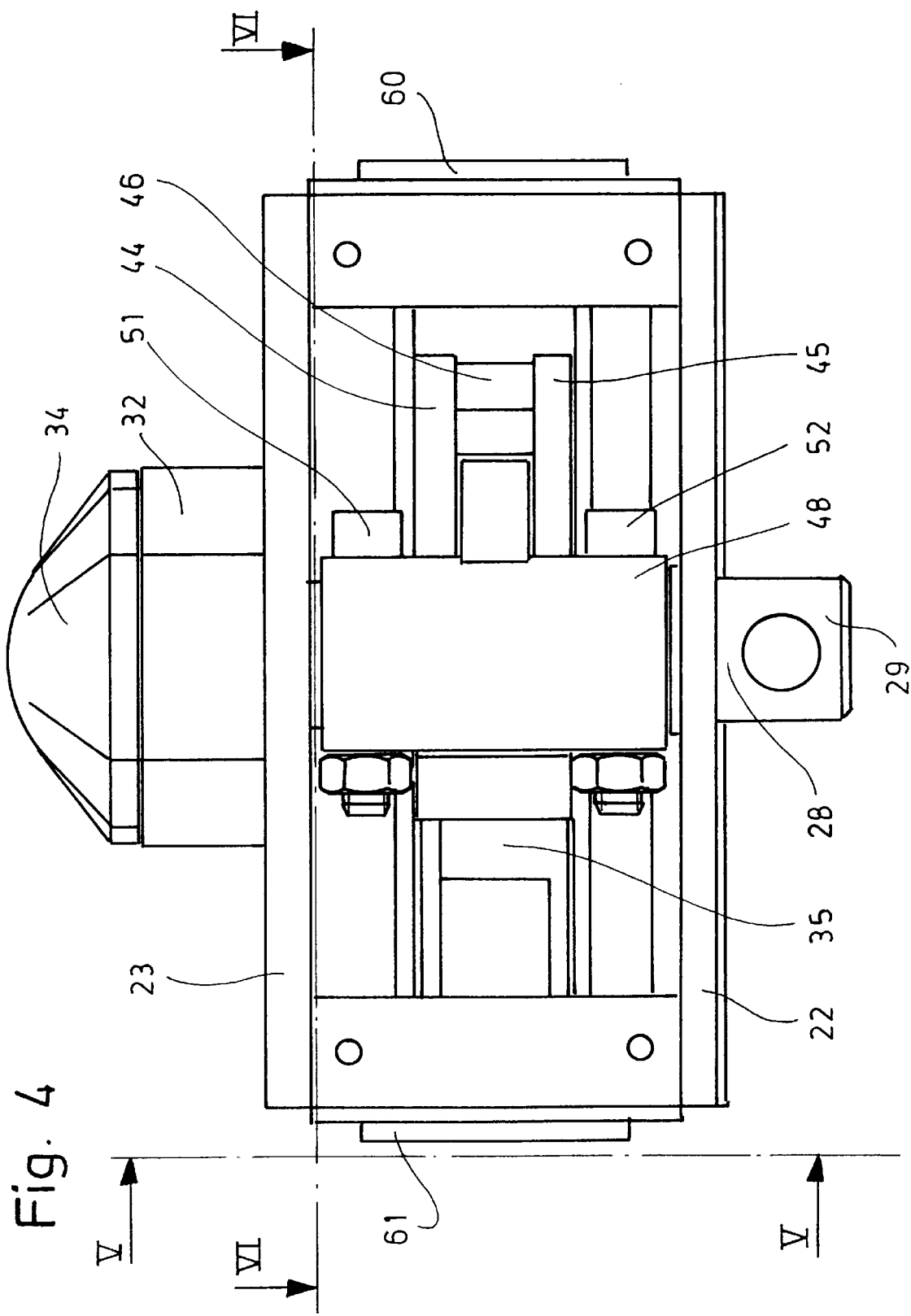
Figure 5:
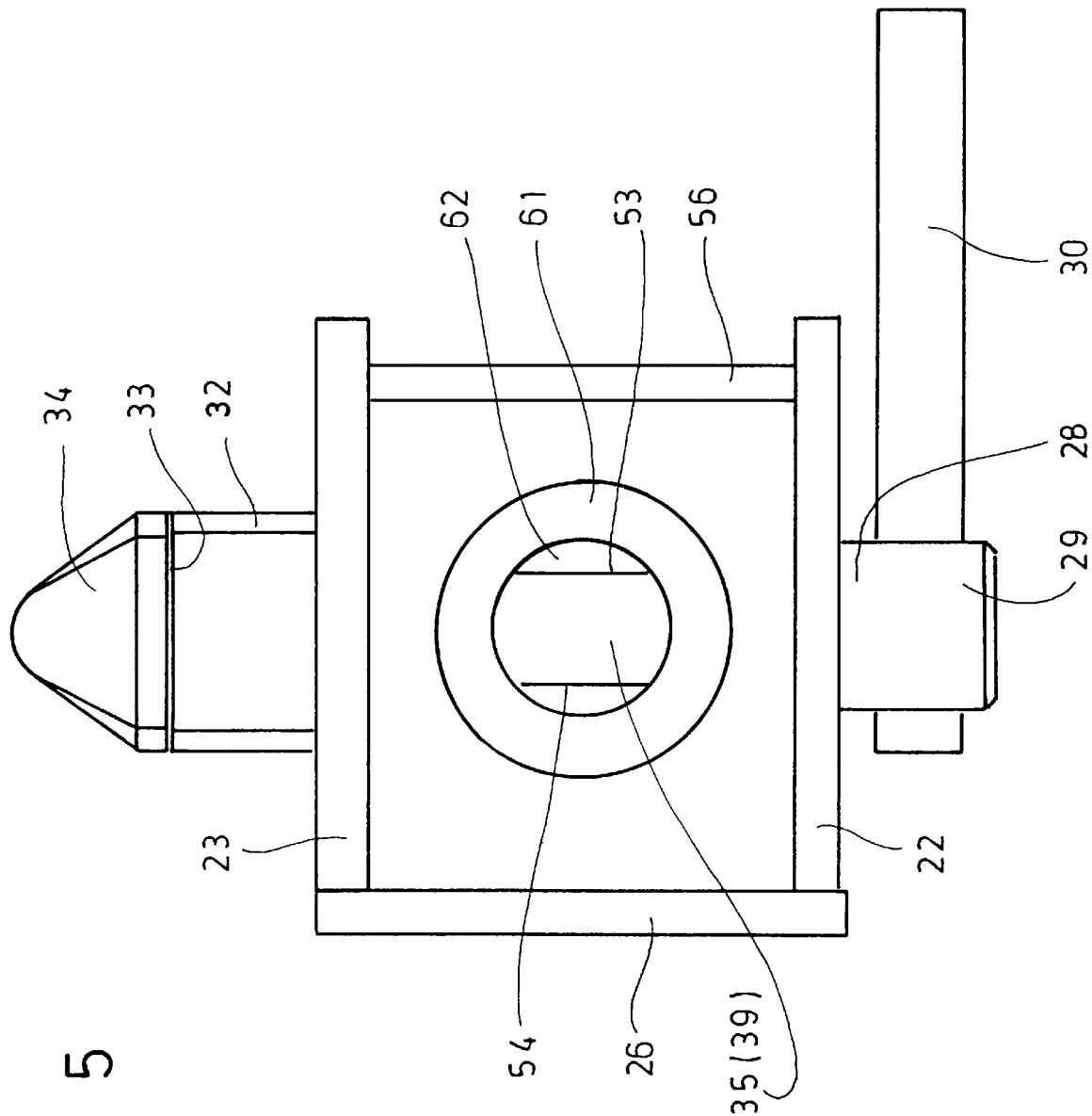
Figure 6:
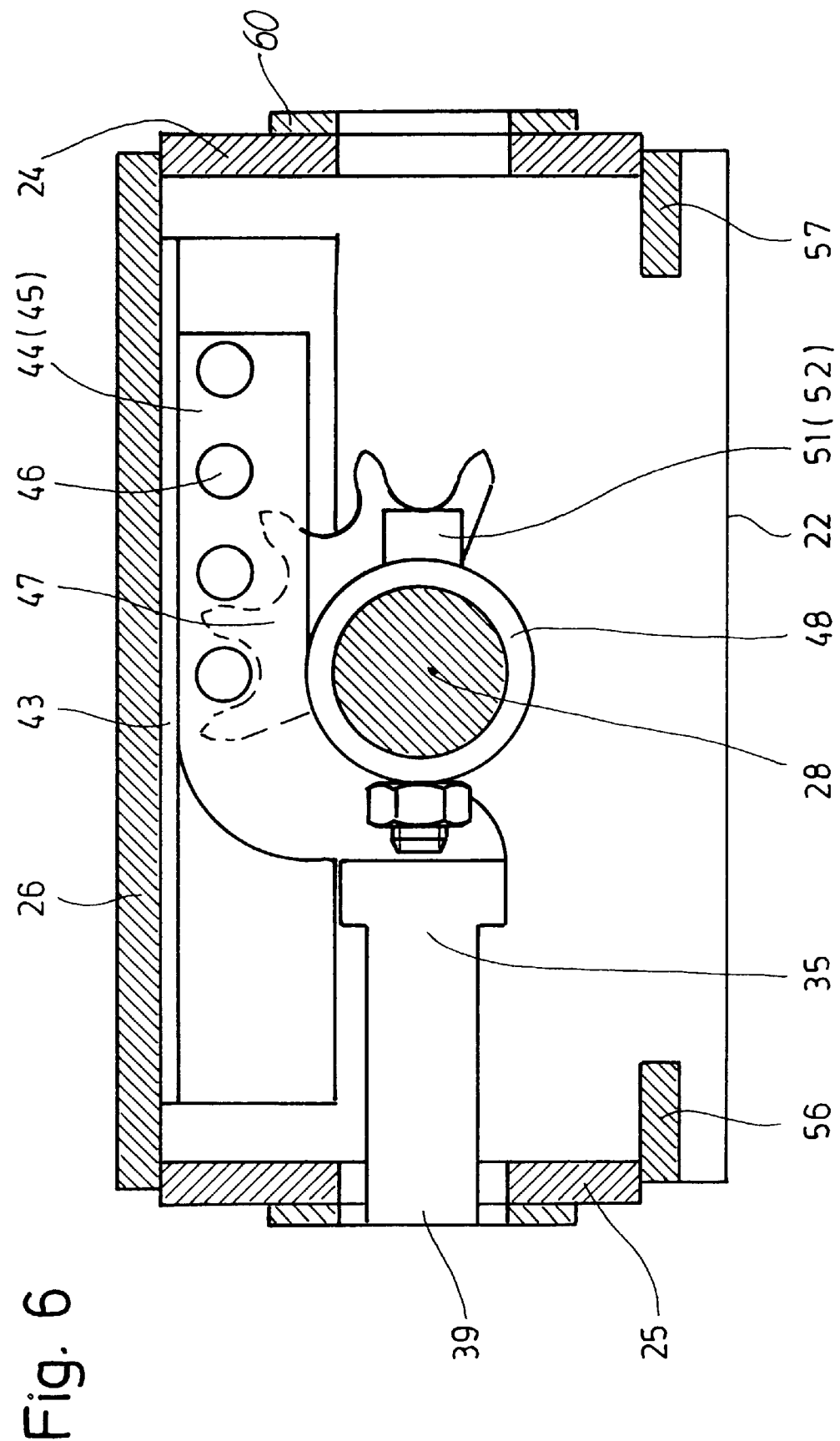
Figure 7:
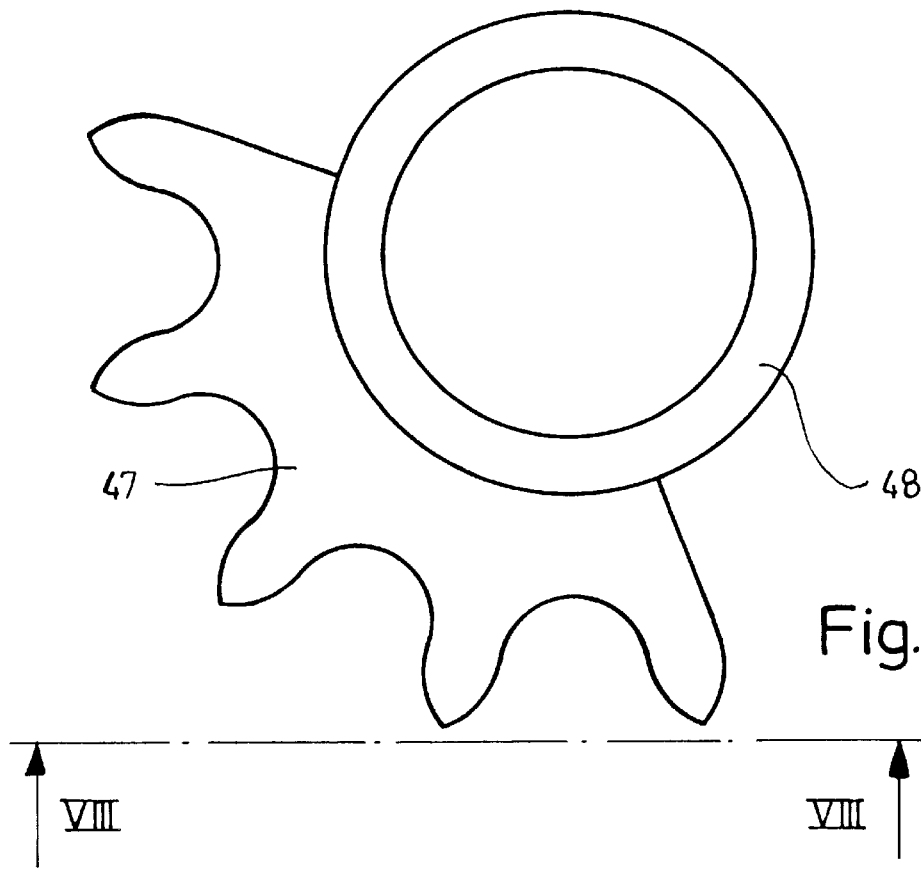
Figure 8:
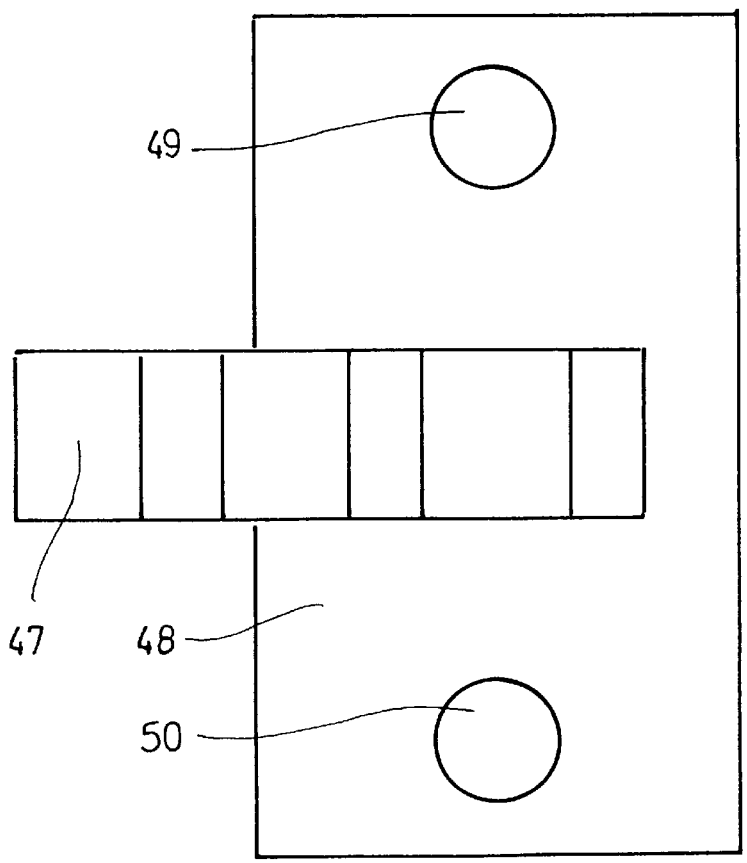
Figure 11:
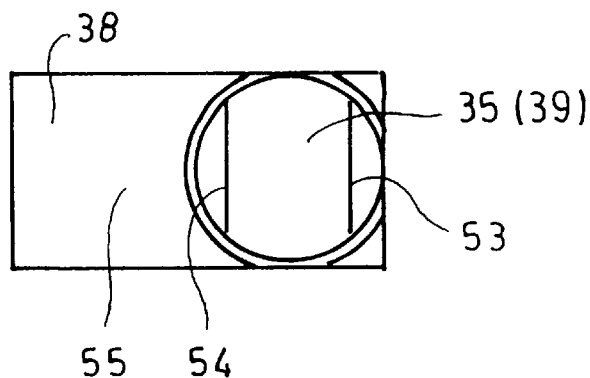
Figure 10:
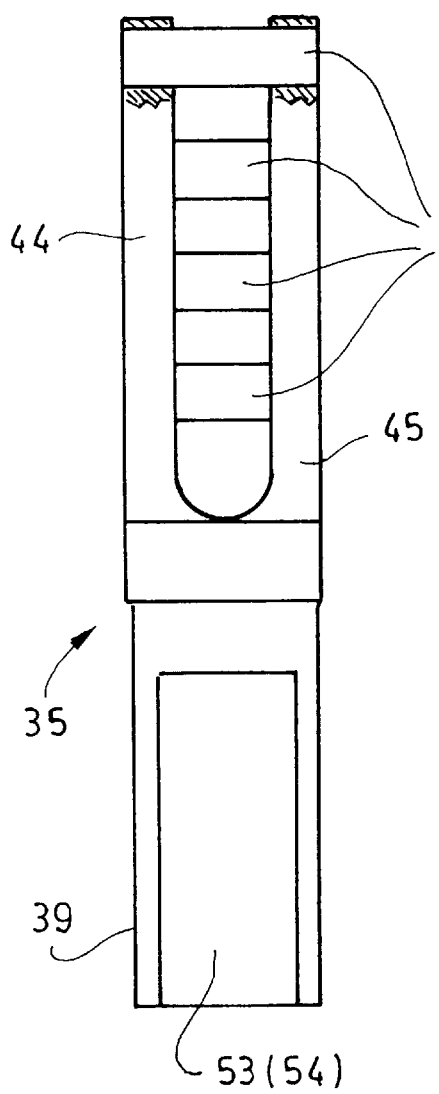
Figure 9:
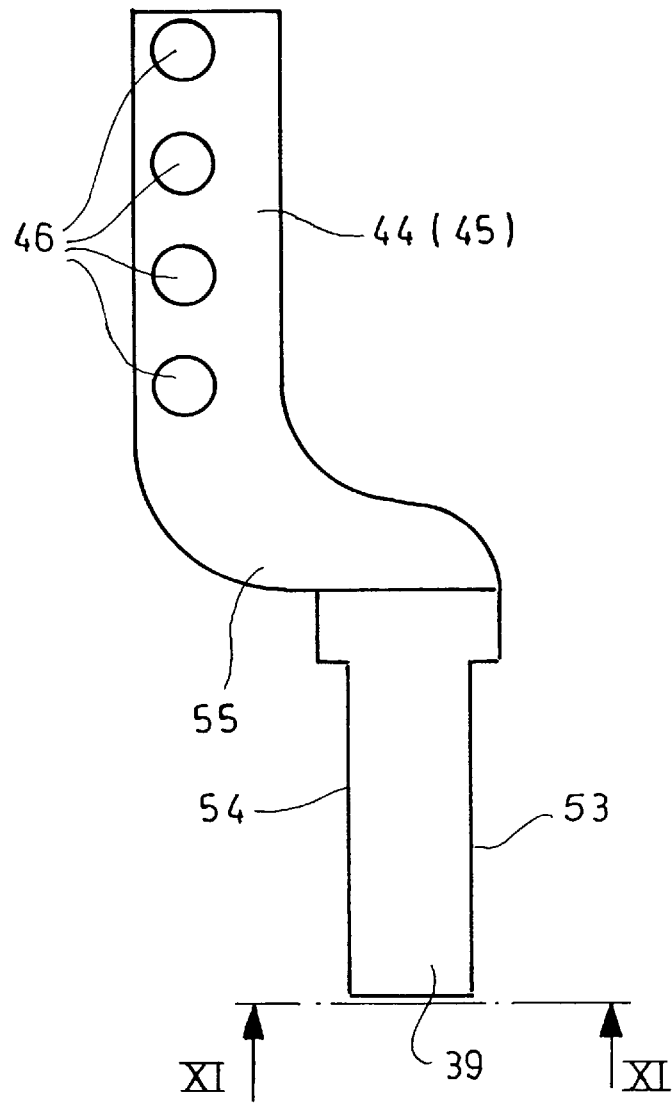
Figure 12:
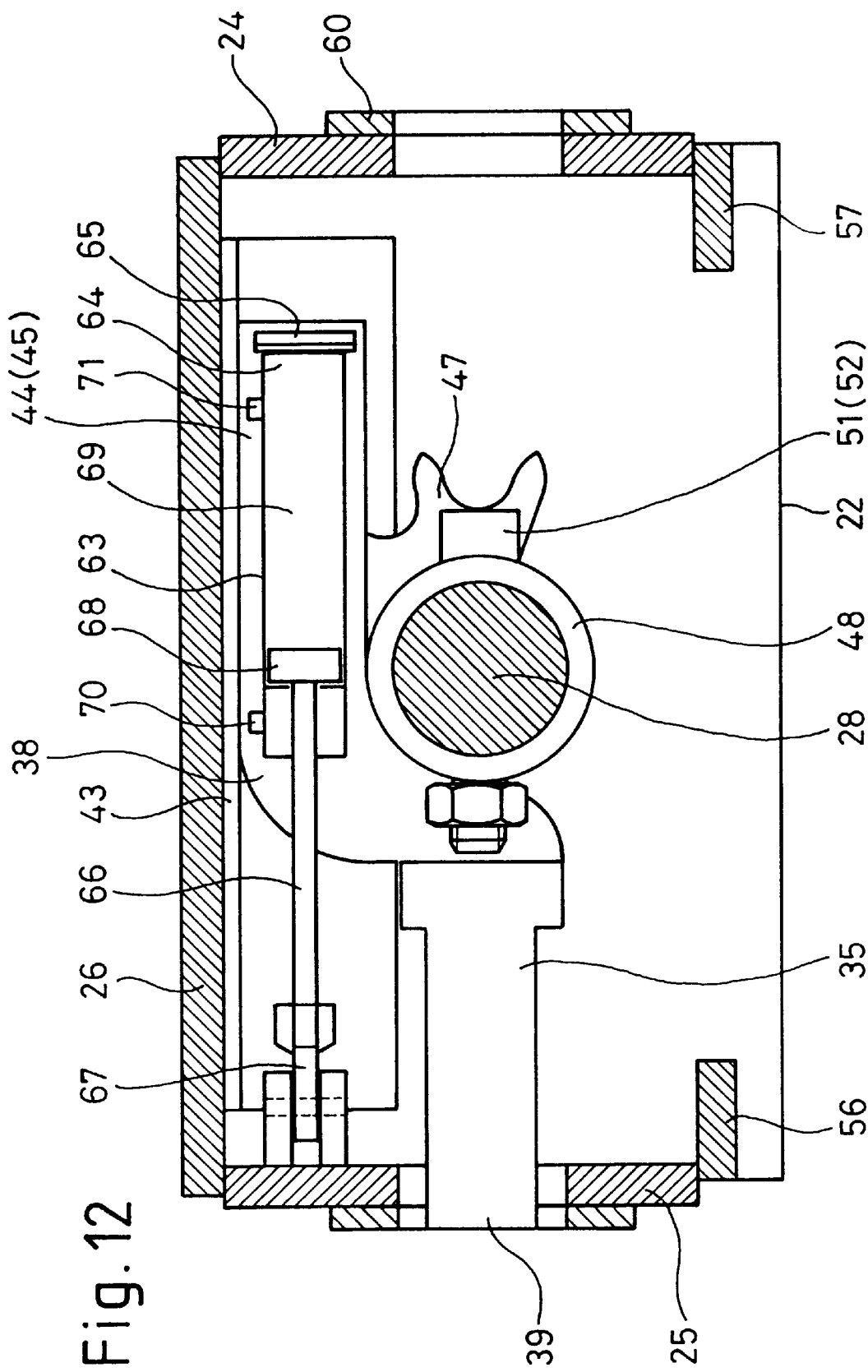
Figure 13:
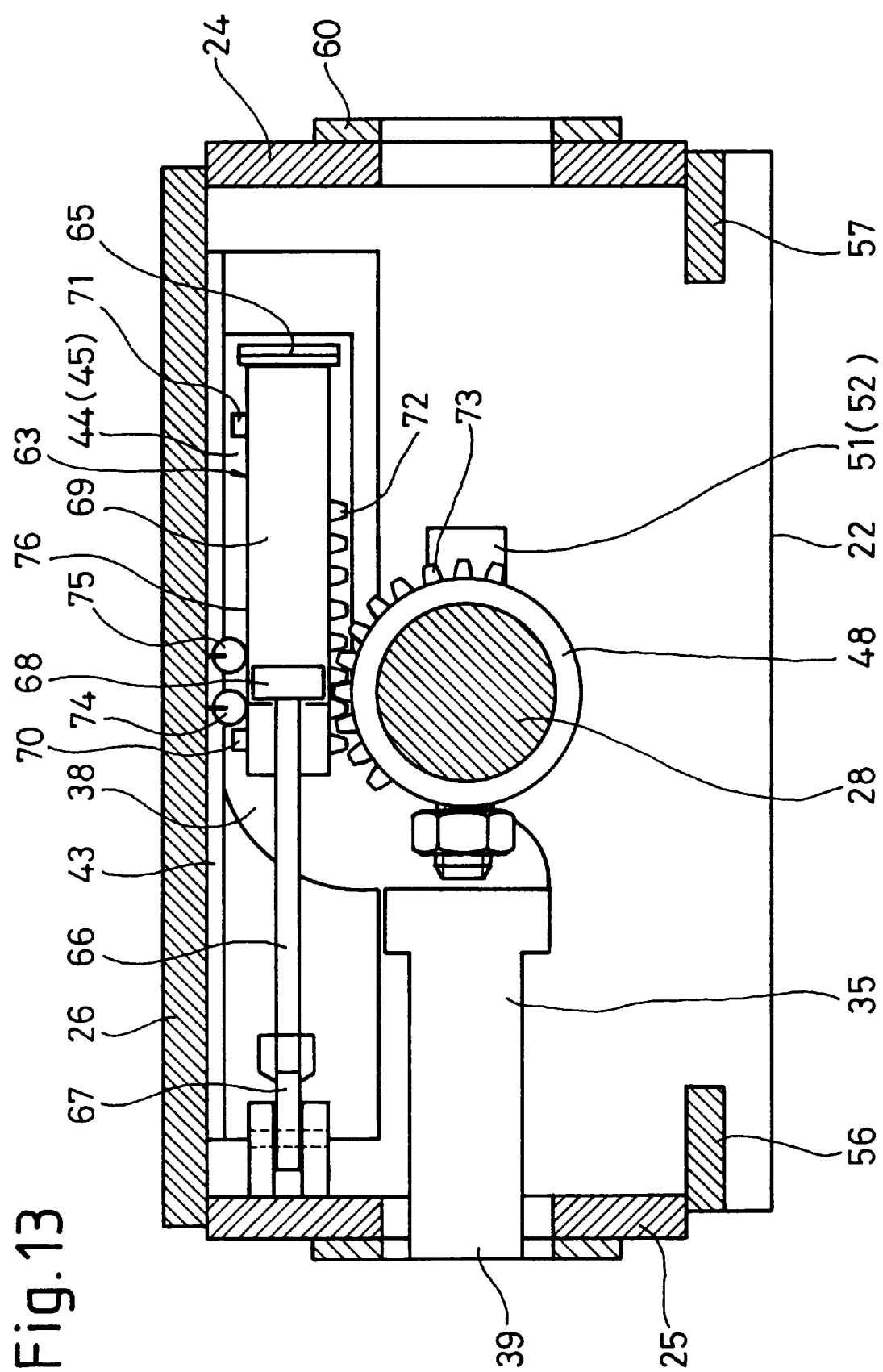

The exemplary embodiments will be detailed in the following as based on the illustrations, in which:

FIG. 1 shows a lateral view of a lock in its operating position, with a side wall removed, FIG. 2 shows a front view of the lock, i.e. a view along the line II—II in FIG. 1, FIG. 3 shows a longitudinal section through the lock along the line III—III in FIG. 1, FIG. 4 shows a view of the lock analogous to FIG. 1, not in its operating position but with inserted bolt lock and a twist lock in receiving position, FIG. 5 shows a front view of the lock according to FIG. 4 along the line V—V (facing the end face shown in FIG. 2), FIG. 6 shows a longitudinal section through the lock according to FIG. 4 along the line VI—VI, analogous to the illustration in FIG. 3, FIG. 7 shows an axial top view of a toothed wheel segment for securing a twist lock, FIG. 8 shows a lateral view of the toothed wheel segment according to FIG. 7, FIG. 9 shows a top view of a bolt lock with extension and mangle gear, corresponding to the views shown in FIG. 6 and 3, FIG. 10 shows a lateral view of the bolt lock according to FIG. 9, FIG. 11 shows a front view of the bolt lock according to FIG. 9 along the lines XI—XI, FIG. 12 shows a longitudinal view analogous to FIG. 6, but with an additional pneumatic driving means for the lock, FIG. 13 shows an alternative embodiment to FIG. 12.

Reference is first made to FIG. 1. Shown therein is a lock 20 for fastening a container to a vehicle chassis. The lock is provided with a housing 21 with a bottom wall 22, a top wall 23, a front end wall 24, a rear end wall 25, a side wall 26 and a side wall 27 opposite side wall 26, which, having been removed, is not visible in the illustration, see FIG. 2.

Arranged or mounted within the housing 21 is a vertical twist lock 28, see in particular FIG. 3. A lower end 29 of the twist lock 28 projects downwards from the bottom wall 22 for receiving a transversely directed lever 30 for actuating the twist lock 28. For this purpose, the lever 30 is held, in particular displaceable, in a transverse boring 31 of the twist lock 28.

Arranged on the top wall 23 is a collar 32. Said collar 32 receives an upper end 33 of the twist lock 28. Connected to the upper end 33 is a lock head 34. The latter grips the container corner from below and secures the container by revolving by 90°. FIG. 1 to 3 show the latching position of the twist lock 28. The described function of the twist lock 28 and the interaction between the lock head 34, collar 32 and container brace The described function of the twist lock 28 and the interaction between lock head 34, collar 32 and container corner is well known and requires no further information.

A bolt lock 35 is furthermore mounted in the housing 21. It typically serves to secure a container with a so-called gooseneck tunnel on a gooseneck chassis, in particular on a container corner provided for this purpose located on the end wall of the container. After the container has been set down upon the gooseneck chassis its corner lies precisely in front of the lock 20 such that the bolt lock 35 can be inserted into the corner. This arrangement particularly protects the container from vertical movements, which is particularly required for the transport of empty containers. The function of the bolt lock is also well known in the relevant trade circles.

The bolt lock 35 is held displaceable in the housing 21. Usually a continuation of the center line 36 of the bolt lock 35 intersects the rotational axis 37 of the twist lock 28, see FIG. 3. The range of movement of the bolt lock 35 within the housing 21 is therefore limited. This bolt lock 35 is thus provided with an extension 38 that runs within the housing 21 and is bent at a right angle in relation to the end 39 of the bolt lock 35 that projects from the housing 21 in the direction of one of the side walls, in the present case in the direction of side wall 26, but which runs parallel to the end 39.

In the region of the extension 38 the bolt lock 35 is led along the side wall 26 in a channel-type guide. This consists of two limbs 40, 41 spaced at a distance from one another and a corresponding region 42 of the side wall 26 between the limbs 40, 41. A sliding plate 43 made of slideable plastic or with a galvanized surface is attached to the wall region 42 in the interior of the housing 21. The reduction of sliding and static friction in this region is advantageous.

The extension 38 has two webs 44, 45 that lie one above the other and which are connected to each other by a plurality, in the present case four round rods 46. The latter extend in a direction parallel to the rotational axis 37 and are held successively at a distance from one another, thus forming a mangle gear between the webs 44, 45. The round rods 46 accordingly lie in a row parallel to the center line 36.

A geared connection exists between the bolt lock 35 and the twist lock 28, in this case formed by the described mangle gearing of the extension 38 and a toothed wheel segment 47 which is disposed on the twist lock 28 and which extends over a partial circle of approximately 125°. The geared connection is such that a 90° rotation of the twist lock is simultaneously accompanied by the desired translatory motion of the bolt lock 35.

The toothed wheel segment 47 is disposed, preferably welded, on a sleeve 48 that is slid on the twist lock 28 and secured to the twist lock 28 by means of through bores 49, 50 and corresponding bolts 51, 52.

The sleeve 48 extends over practically the entire inner height of the housing 21 so that the twist lock 28 is positioned in the housing 21 by the sleeve 48 being fastened on the twist lock.

In an embodiment not shown here the gearing of the twist lock 28 is part of the same and does not extend past the circumference of the twist lock in the radial direction. The extension 38 then has a toothed rack that that is suitable.

FIGS. 4 to 6 show twist lock 28 and bolt lock 35 in their inserted position or in a waiting position for receiving the respective container. The bolt lock 35 is completely inserted into the housing 21. The oval lock head 34 ends flush with collar 32, see in particular FIG. 4 and 5. The dimensions of the bolt lock 35 including the extension 38 have been measured relative to the length of the housing 21 so that the bolt lock 35 can be put into the housing as a whole through the side 27. Afterwards the sleeve 48 with the toothed wheel segment 47 in the region of the rotational axis is held ready and the twist lock 28 is introduced into the housing from above until it projects out of the bottom end 29. The lever 30, analogous to the sleeve 48, can be inserted into the end 29 through a corresponding sleeve (not shown). Other types of securing means are conceivable.

The end 39 of the bolt lock 35 projecting from the housing 21 has a round cross-section with flattenings 53, 54 on both sides. The movement of the bolt lock 35 out of the housing is preferably limited by the abutment of an elbow 55 located in the region of the right-angle bend at the rear end wall 25.

Provided in the region of the side 27 is a removable side wall, which is not shown in further detail. It is held in place by narrow wall webs 56, 57 which are located adjacent to the end walls 24, 25 and inserted transverse thereto. Each of the two wall webs have two bores 58, 59 which can be provided with a screw thread for screwing on the side wall (not shown).

The end walls 24, 25 are constructed in a special manner. These are provided either with a closed cover 60 (end wall 24) or have a cover 61 with a through bore 62 through which the bolt lock can pass (end wall 25). Instead of a cover, a clearance lamp (not shown) or a receptacle for such a lamp can be inserted in the end wall.

As a whole the housing 21 is completely closed. Dirt or dust cannot enter. For achieving an even better seal the existing openings can be secured with sealing means, in particular in the region where the twist lock 28 passes through the top wall 23 and/or bottom wall 22.

The shown lock 20 is intended for assembly onto the transverse bar of a vehicle chassis on the front right side. The side wall 26 is preferably welded laterally onto the transverse bar (not shown). The transverse bar itself can have a closed cross-section. Recesses for operating elements of the lock are not necessary. Correspondingly, the transverse bar retains the high degree of stability required after the lock 20 has been mounted onto it.

The housing 21 as a whole has a symmetrical design. By exchanging the mounting of the covers 60, 61 and using the corresponding alternate assembly of the bolt lock 35, the lock can also be prepared for mounting on the left side of the vehicle chassis. The removable side wall 27 then lies once more in a lateral outside position on the vehicle chassis.

The described geared connection between twist lock 28 and bolt lock 35 allows for a simple and error-free actuation of the lock. Turning the lever 30 forces an actuation of both latching members (both locks 28, 35). There is no need on the part of the operator to distinguish between latching members on hand and between actuating members on the other. This results in a significant increase in workplace safety.

In a further embodiment a piston-cylinder unit for actuating the twist lock 28 is arranged in or on the housing 21. Preferably a lever arrangement for connecting the twist lock 28 and the piston-cylinder unit is provided in a likewise manner. The piston-cylinder unit can constructed as a double-acting unit or provided with two piston-cylinder arrangements. Also possible is a single acting version with the return movement being made by means of spring force. Vehicles for transporting containers have at any rate a pneumatic system of their own. This could be easily employed to drive and actuate a pneumatic servo component. In this way a compressed air supply could be provided on the housing 21 while the piston-cylinder unit is arranged within the housing. This in turn eliminates any risk of dirt and dust contamination while at the same time allowing for remote control of the lock from the vehicle's cabin.

Specific drawings relating to the idea of the pneumatic-controlled adjustment motion are shown in FIG. 12 and 13. According to FIG. 12 a double-acting cylinder 63 is arranged above the extension 38 of the bolt lock 35. A free end 64 of the cylinder 63 is connected to the extension 38 (near the free end of the same) by means of a swivel fixed pivot bracket 65.

A piston rod 66 emerges from one end of the cylinder 63 and is connected to the housing, namely here to the rear end wall 25, by means of hinge head 67. The movement of a piston 68 in the piston displacement 69 is controlled by means of compressed air connections 70, 71. The feeding of compressed air to the connections 70, 71 and the further conveyance of the air within the cylinder 63 is not shown in any further detail. For example, the connections could be connected to flexible compressed air hoses, which in turn are led out of the housing by means of corresponding stationary connections in the housing walls.

The geared connection between the bolt lock 35 and the twist lock 28 is the same as previously described according to FIG. 1 to 11, namely by means of a toothing, see toothed wheel segment 47. Driving the compressed air connection 70 located at the piston rod 66 end causes the cylinder 63 to be displaced relative to the piston 68 in the direction of the piston rod 66. The bolt lock 35, which is connected to the cylinder 63 by means of the pivot bracket (and extension 38), is forced to execute the movement of the cylinder, traveling from the position shown in FIG. 12 to the left into its latching position. The twist lock is moved accordingly by virtue of the geared coupling. In order to unlatch the device, the corresponding reverse operation is performed, with the air connection 71 being impinged on and connection 70 evacuated.

Naturally the cylinder 63 and piston rod 66 can also exchange positions so that the cylinder 63 is connected to the end wall 25 and the piston rod 66 is connected to one part of the bolt lock by means of a pivot bracket.

FIG. 13 shows a alternative pneumatic actuation. Cylinder 63 and piston rod 66 are once again connected to the bolt lock 35 and the housing so that a movement of the bolt lock 35 can be triggered by driving the cylinder 63. A reverse mounting of cylinder 63 and piston rod 66 is possible, as described above with reference to FIG. 12.

In addition, a geared coupling (instead of the geared coupling in FIG. 12) exists between the arrangement consisting of piston rod 66, piston 68, cylinder 63 on one hand, and the twist lock 28 on the other hand. In the present case the cylinder 63 has an external gearing 72 facing the twist lock 28 in a manner similar to that of a toothed rack. Correspondingly to this the sleeve 48, which is firmly connected to the twist lock 28, is provided with a toothed wheel segment 73 or a toothed wheel. Movement of the cylinder 63 is translated by the teeth 72, 73 thus automatically turning the twist lock 28.

The external gearing 72 can be part of the double-acting cylinder 63 or a sleeve (not shown here) encompassing the cylinder 63.

Any shearing forces that may arise are intercepted at one side of the cylinder 63 lying opposite the external gearing 72. Here is namely where pressure rollers are mounted rotatable on the side wall 26. An outer wall 76 of the cylinder 63 rolls on the pressure rollers 74, 75 whenever the cylinder moves.

What is claimed is:

1. Lock for containers on a vehicle chassis, in particular on a gooseneck vehicle chassis, said lock comprising:
    a housing (21),
    a first lock (35) mounted in the housing for engaging a first lock fitting on the container, and
    a second lock (28) mounted in the housing for engaging a second lock fitting on the container, characterized in that the first lock is a bolt lock (35) and the second lock is a twist lock (28), and the first lock and the second lock are operatively connected to each other by means of a geared coupling in such a way that when one of the locks is actuated the other lock also is actuated.

2. Lock according to claim 1, characterized in that said geared coupling comprises a rack and pinion, wherein:
    the pinion is attached to the twist lock (28), the pinion comprising a toothed wheel segment (47) of between 80° to 140° of a circle,
    the rack is attached to the bolt lock (35), the rack comprising gear toothing selected from the group consisting of a toothed rack and a mangle gear type (44, 45, 46), and
    said rack and pinion intermesh for the geared coupling of bolt lock (35) and twist lock (28).

3. Lock according to claim 1, characterized in that said geared coupling comprises a rack and pinion, wherein:
    the pinion is attached to a sleeve (48) that is held secure against torsion on the twist lock (28), and comprises a toothed wheel segment (47) extending outwardly from the sleeve.

4. Lock according to claim 2, characterized in that:
    the bolt lock comprises a locking end (39) having a longitudinal axis (36) and an extension (38), and
    the twist lock comprises a rotational axis (37),
    wherein the extension (38) of the bolt lock (35) is bent at a right angle in a lateral direction to the locking end in such a way that a continuation of the longitudinal axis (36) intersects approximately the rotational axis (37) of the twist lock (28), and the extension (38) runs laterally adjacent to the twist lock (28).

5. Lock according to claim 4, characterized in that said housing comprises a side wall (26), and the extension (38) is guided along a side wall (26) of the housing (21).

6. Lock according to claim 5, characterized in that the extension (38) is held longitudinally displaceable between the twist lock (28) and a side wall (26) by a channel-type guide secured to a side wall (26).

7. Lock according to claim 5, characterized in that a side wall (26) of the housing (21) is provided with two webs (40, 41) arranged at a distance to one another and disposed in horizontal, superimposed planes, between which the extension (38) is led, said webs comprising bearing surfaces for interacting with the extension.

8. Lock according to claim 5, characterized in that the bolt lock (35) is led laterally between the twist lock (28) and a side wall (26) in a sliding manner and a side wall further comprises a reduced friction surface selected from the group consisting of a plastic strip (43) and a galvanized surface, said reduced friction surface extending parallel to the longitudinal direction of the bolt lock (35).

9. Lock according to claim 4, characterized in that the twist lock (28) further comprises a lower end (29) and a lever (30) for rotating the twist lock, said lever being disposed perpendicular to the rotational axis (37) and connected to said lower end (29).

10. Lock according to claim 9, characterized in that the housing (21) further comprises a bottom wall, and the lever (30) is offset a distance from the bottom wall 22 of the housing (21).

11. Lock according to claim 1, characterized in that the housing (21) is closed on all sides, having merely openings for a locking end (39) of the bolt lock (35) and the lower end (29) of the twist lock.

12. Lock for containers on a vehicle chassis comprising:
 a. a housing having a top wall, bottom wall, two side walls, and two mutually opposing end walls;
 b. a bolt lock mounted in the housing as a locking member, said bolt lock having a longitudinal axis and said bolt lock being displaceable along the longitudinal axis, said bolt lock comprising a locking end that extends through an opening in one of the end walls of the housing when the bolt lock is actuated;
 c. a twist lock mounted in the housing as a locking member, said twist lock having a rotational axis and said twist lock being displaceable about the rotational axis, the rotational axis running transverse to the longitudinal axis of said bolt lock, said twist lock comprising a lock head that extends through an opening in the top wall of the housing; and
 d. a geared coupling operatively coupling said bolt lock and said twist lock such that the actuation of one locking member results in the actuation of the other locking member.

13. Device according to claim 12, characterized in that the locking members are operatively coupled to each other by means of said geared coupling such that when said twist lock is turned to a locked position the locking end of said bolt lock is moved out of the housing, and when said twist lock is turned to an unlocked position the locking end of said bolt lock is moved into the housing.

14. Device according to claim 12, characterized in that said twist lock further comprises a toothed gear pinion, and said bolt lock further comprises an extension arranged in the housing, said extension comprising a gear rack running in the longitudinal direction of said bolt lock, wherein the gear rack of the bolt lock and the toothed gear pinion of the twist lock intermesh to form a geared coupling of the two locking members.

15. Device according to claim 14, characterized in that the longitudinal axis of said bolt lock intersects the rotational axis of said twist lock, the extension runs laterally adjacent to said twist lock and at a distance apart from and parallel to the longitudinal axis of said bolt lock, and the extension is laterally offset from the longitudinal axis of said bolt lock.

16. Device according to claim 14, characterized in that the gear rack of said bolt lock is a mangle gear toothing.

17. Device according to claim 16, characterized in that the mangle gear toothing comprises two webs lying one above the other and which are connected to each other by means of a plurality of rods, wherein the rods extend parallel to the rotational axis of said twist lock and are arranged in a row at a distance from one another, with said row running parallel to the longitudinal axis of said bolt lock.

18. Device according to claim 14, characterized in that the toothed gear pinion extends at a rotational angle of at least 80° and no more than 140° of a complete circle.

19. Device according to claim 14, characterized in that the toothed gear pinion is part of a sleeve surrounding said twist lock, the sleeve being held secure against torsion on said twist lock.

20. Device according to claim 12, characterized in that said twist lock further comprises a means for twisting said twist lock about the rotational axis.

21. Device according to claim 20, characterized in that said twist lock further comprises a lower end that extends out of the housing through the bottom wall, and said means for twisting comprises a lever that is secured to the lower end of said twist lock and is disposed perpendicularly to the rotational axis, for the purpose of actuating the lock.

* * * * *